United States Patent

Tanzen

[11] 4,076,877
[45] Feb. 28, 1978

[54] CELLULAR STRUCTURE PLATE

[75] Inventor: Wilhelm Tanzen, Nordenham, Germany

[73] Assignee: Vereinigte Flugtechnische Werke - Fokker GmbH, Bremen, Germany

[21] Appl. No.: 576,786

[22] Filed: May 12, 1975

[30] Foreign Application Priority Data

May 24, 1974 Germany .............................. 2425014

[51] Int. Cl.² ................................................ B32B 3/12
[52] U.S. Cl. ........................................ 428/73; 52/617;
52/618; 428/117; 156/197; 156/303.1
[58] Field of Search .................. 428/72, 73, 116, 117,
428/118, 119, 120, 63, 192; 264/36; 156/197,
303.1; 52/617

[56] References Cited

U.S. PATENT DOCUMENTS

| | | | |
|---|---|---|---|
| 2,585,557 | 2/1952 | Kreimendahl | 52/617 |
| 2,823,460 | 2/1958 | Weiler | 33/174 |
| 2,837,779 | 6/1958 | Jacobs | 52/303 X |
| 3,016,578 | 1/1962 | Rohe | 52/617 X |
| 3,173,520 | 3/1965 | Fisher | 52/309 |
| 3,305,996 | 2/1967 | Shapiro | 52/617 |
| 3,380,552 | 4/1968 | Segil et al. | 181/33 |
| 3,470,058 | 9/1969 | Heffner | 428/119 |
| 3,485,282 | 12/1969 | Lopez et al. | 264/249 X |
| 3,697,630 | 10/1972 | Yoshino | 264/28 |
| 3,886,023 | 5/1975 | Deplante | 52/617 X |
| 3,887,739 | 6/1975 | Kromrey | 428/117 X |

Primary Examiner—George F. Lesmes
Assistant Examiner—Henry F. Epstein
Attorney, Agent, or Firm—Ralf H. Siegemund

[57] ABSTRACT

A flat honeycomb filler plate is provided with recesses to receive laminated, curable inserts. Flat top and bottom sides of the plate are covered by curable skins and a curable ribbon is wrapped around the narrow sides of that plate. The entire assembly is heat cured to obtain an intimate bond.

3 Claims, 2 Drawing Figures

CELLULAR STRUCTURE PLATE

BACKGROUND OF THE INVENTION

The present invention relates to a cell structure plate which includes a filler and an outer skin made of plastic.

Plates of the type to which the invention pertains are known building elements for lightweight structures. These plates include additionally reinforcement elements for reacting external forces into the interior of such a plate. Reinforcement is established for example by stronger rims in beadlike fashion, or ribs are provided so as to establish a localized thickening of solid material. Metallic inserts have also been used for reinforcement.

It was found, however, that plastic reinforcement will not prevent tears or other rupture if the plate is subjected to highly localized forces; for example, when metallic rivets, bolts or the like are inserted. A metallic reinforcement will serve better here, but the embedding and anchoring of the metal in the structure plate is a very difficult problem.

Another way of providing for subsequent reinforcement particularly to strengthen the plate against localized forces is to provide for pegs, dowels or the like and bond them into the plate after the plate has been made. This subsequent insertion is a cumbersome operation. Moreover, the bonding between insert and plate is not a very intimate one, and the plate texture is interrupted over a rather large area.

DESCRIPTION OF THE INVENTION

It is an object of the present invention to provide a cellular structure plate with well defined locations for reaction of forces into the plate and which is easy to make.

In accordance with the preferred embodiment of the invention, it is suggested to provide a flat cellular filler plate, preferably of honeycomb structure wherein the honeycomb contour is in planes parallel to the flatness extension of the plate and longitudinal walls defining the cells extending in the direction of the thickness dimension of that plate. The plate is provided with recesses for receiving heat curable fillers, inserts or bodies, preferably being of laminated construction. The flat sides are covered with heat curable, plastic skin. Preferably, a double-ribbon with an inner, heat curable layer, and, preferably outer cured layer is wound around the narrow sides of that plate. The assembly is subsequently heated to heat cure the various parts under pressure which thereby become bonded together and to the filler plate.

DESCRIPTION OF THE DRAWINGS

While the specification concludes with claims particularly pointing out and distinctly claiming the subject matter which is regarded as the invention, it is believed that the invention, the objects and features of the invention and further objects features and advantages thereof will be better understood from the following description taken in connection with the accompanying drawings in which:

Figure 1:
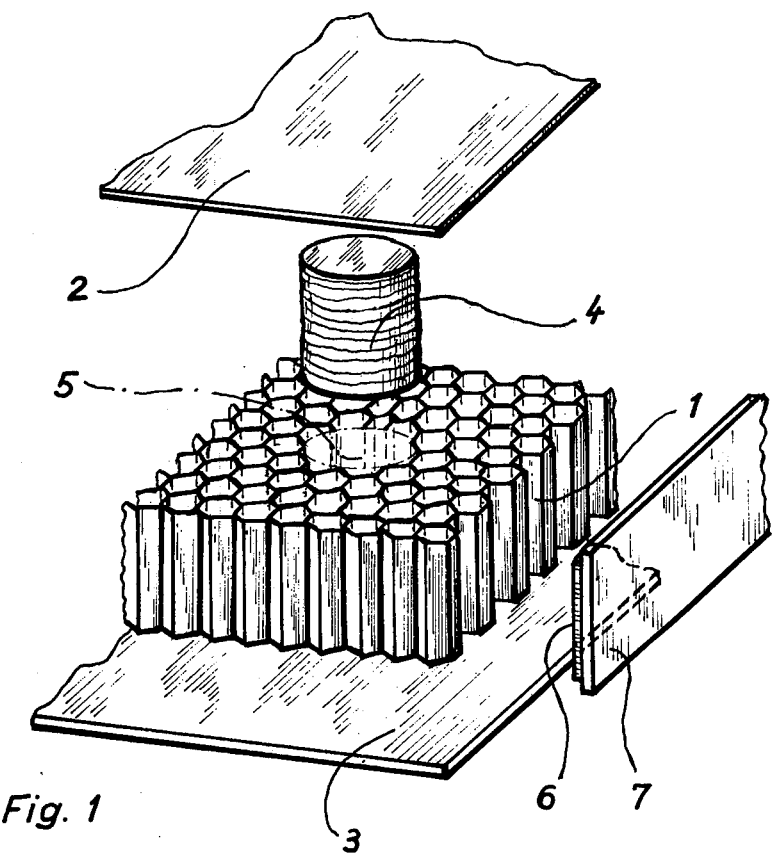
FIG. 1 is a perspective, exploded view of an example for the preferred embodiment of the invention.
Figure 2:
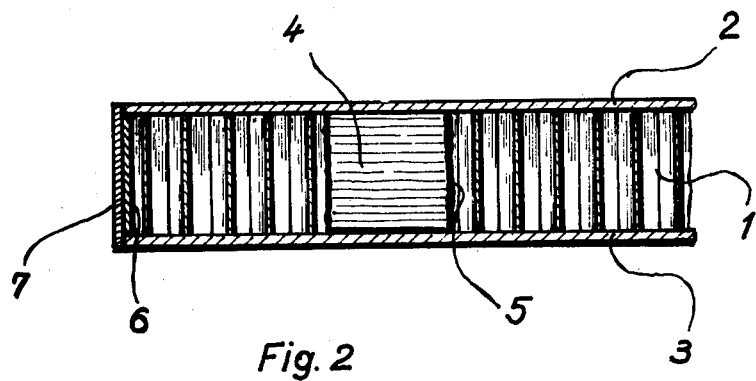
FIG. 2 is a cross-section through such a plate.

Proceeding now to the detailed description of the drawings, the cell-structure plate includes a filler body 1 being of honeycomb structure in that the cells have hexagonal cross-section and extend in the thickness dimension of the plate. The filler plate 1 is made of plastics, but could be of any other kind of material provided it is amenable to undergo a good bond with a curable plastic when that plastic is cured.

The honeycomb structure is covered by skin plates 2 and 3 which may be a single layer or foil or of laminated construction. These skins or covers 2 and 3 are made of temperature, i.e. heat curable plastic such as glassfibre reinforced plastic (epoxy-resin).

The filler plus skin structure is enveloped along the four sides by a ribbon 6, 7 which is a two layer or lamina plastic ribbon. The layer 6 adjacent filler 1 is made of not-yet cured plastic while layer 7 has already been cured. The material may be the same as shown for skins 2 and 3.

The filler 1 is provided with recesses 5 (only one being shown) having, on the average round, cylindrical contour established by elimination of some cell and some of the wall structure. Inserts 4 are inserted in these recesses. These inserts are made of a stack of disks i.e. they are of laminated construction, the lamina extending transversely to a cylinder axis. The material used here is or may be the same as for the skins 2 and 3.

In order to make a plate of the type described, one makes first the honeycomb filler 1 by usual process. Next, openings are punched to establish the recesses or bores 5. It should be noted that the cylindrical contour of each bore is defined by residual cell walls.

The inserts 4 are made separately e.g. by stacking lamina and punching cylinders therefrom. Alternatively, disks may be punched out and stacked. The disks may be bonded together, but the heat treatment for curing may actually suffice to obtain bonding the disks together. In other words, the disks may be loosely assembled in the recesses 5 and stacked therein.

In general, the inserts 4 are then inserted into the recesses 5 of the filler 1 which has been placed with its lower flat side on a skin 3. After placement of the inserts, the top flat side of filler plate 1 is covered by skin 2, and finally the two ribbon assembly 6, 7 is wrapped around the filler 1. After having completed that assembly, pressure is applied from above and below, and the assembly is heated for curing the ribbon 6, the inserts 4 and the skins 2, 3. The temperature for curing is about 250° F, the pressure is about 30 psi, and the curing time is about 1 hour.

As a consequence of heat curing the various parts when assembled, an intimate bond is produced between them where engaging each other as well as between the filler plate and the heat curing plastic parts wherever in engagement therewith.

The invention is not limited to the embodiments described above but all changes and modifications thereof not constituting departures from the spirit and scope of the invention are intended to be included.

I claim:

1. Cellular structure plate with well defined locations for taking up external forces, comprising:
   a flat filler plate having cell structure and a plurality of recesses, respectively at the said locations, each recess being larger than the cells of the structure;
   insert bodies inserted in the recesses and made of heat curable, laminated resin plastic, heat cured when inserted;
   a skin covering top and bottom of the filler plate including the insert bodies and being also made of plastic heat cured when applied to the plate, the skins being bonded to the insert bodies as a result from curing when in place; and a laminated ribbon having a precured resin outer layer a curable resin inner layer wrapped around the plate and heat cured thereafter.

2. Cellular plate as in claim 1 wherein the cell structure has honeycomb cross-section in planes parallel to said flat sides.

3. Cellular structure plate with well defined locations for taking up external forces, comprising:

a flat filler plate having cells which extend transverse to the extension of the plate;

the plate having recesses respectively at the said locations and having the form of missed cell structures, extending at least from one flat side in the said transverse direction;

inserts of laminated structure in said recesses and comprised of plastic that was heat cured following insertion in said plate;

a skin covering both flat sides and made of plastic that was heat cured in place, together with said inserts; and a laminated ribbon having a precured resin outer layer, and a heat curable inner layer, being wrapped around the plate, the inner layer having been heat cured following the wrapping.

* * * * *